United States Patent [19]

Abe et al.

[11] Patent Number: 5,185,188

[45] Date of Patent: Feb. 9, 1993

[54] METHOD FOR SURFACE TREATING AND COATING RESIN COMPOSITION MOLDED ARTICLES

[75] Inventors: Hiroomi Abe; Hideo Shinonaga; Kiyoshi Mitsui; Satoru Sogabe, all of Chiba, Japan

[73] Assignee: Sumitomo Chemical Co., Ltd., Osaka, Japan

[21] Appl. No.: 616,969

[22] Filed: Nov. 21, 1990

[30] Foreign Application Priority Data

Nov. 21, 1989 [JP] Japan ................................ 1-304216

[51] Int. Cl.$^5$ .............................................. B05D 3/06
[52] U.S. Cl. ...................................... 427/533; 264/22;
427/322; 427/393.5; 428/423.5; 428/423.7;
428/424.8; 522/96; 522/116; 522/161
[58] Field of Search ..................... 427/54.1, 322, 393.5;
428/423.5, 423.7, 424.8; 264/22; 522/96, 113,
114, 116, 161

[56] References Cited

U.S. PATENT DOCUMENTS

| | | | |
|---|---|---|---|
| 3,111,424 | 11/1963 | Le Clair | 522/113 X |
| 4,780,505 | 10/1988 | Mashita et al. | 525/66 |
| 4,933,123 | 6/1990 | Yoshida | 264/22 |
| 4,950,549 | 8/1990 | Rolando et al. | 522/116 X |
| 5,039,549 | 8/1991 | Nguyen et al. | 427/54.1 |

FOREIGN PATENT DOCUMENTS 0356194  2/1990  European Pat. Off. .

OTHER PUBLICATIONS

Patent Abstracts of Japan, vol. 9, No. 59 (C-270)[1782], Mar. 15, 1985.
Patent Abstracts of Japan, vol. 7, No. 201 (C-184)[1346], Sep. 6, 1983.
Patent Abstracts of Japan, vol. 13, No. 278 (C-611)[3626], Jun. 26, 1989.

*Primary Examiner*—Michael Lusignan
*Attorney, Agent, or Firm*—Sughrue, Mion, Zinn, Macpeak & Seas

[57] ABSTRACT

A method for surface treating a resin composition molded article and a method for coating a resin composition molded article are disclosed, which comprise irradiating a molded article with ultraviolet light having an irradiation wavelength in the region of 300 nm or less and, if desired, coating the thus UV-irradiated surface with a coating, the molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of at least one thermoplastic resin selected from the group consisting of a polyamide resin, a polyphenylene ether resin, a mixture of a polyphenylene ether resin and a styrene resin, a graft copolymer of a polyphenylene ether resin and styrene, and a saturated polyester resin; and (II) up to 30 parts by weight of at least one compatibilizer for improving compatibility between the polypropylene resin (A) and the thermoplastic resin (B), the compatabilizer being selected from the group consisting of an unsaturated carboxylic acid compound having at least one carboxyl group in the molecule thereof or a derivative thereof, a diamine compound having at least two nitrogen atoms in the molecule thereof or a derivative thereof, and an epoxy-containing copolymer.

65 Claims, No Drawings

METHOD FOR SURFACE TREATING AND COATING RESIN COMPOSITION MOLDED ARTICLES

FIELD OF THE INVENTION

This invention relates to a novel method for surface treating and coating a resin composition molded article, film or sheet obtained by injection molding, extrusion molding, etc. More particularly, it relates to a method for surface treating and coating a resin composition molded article having well-balanced physical properties and an excellent appearance which comprises a polypropylene resin, at least one thermoplastic resin selected from a polyamide resin, a polyphenylene ether resin, a polymer blend of a polyphenylene ether resin and a styrene resin, a graft copolymer of a polyphenylene ether resin and styrene, and a saturated polyester resin, and a compatibilizer.

BACKGROUND OF THE INVENTION

Polypropylene has been widely used in various molded articles, films and sheets because of its excellent properties in moldability, toughness, water resistance, gasoline resistance, chemical resistance, and the like.

However, polypropylene has difficulties or defects which need to be overcome in heat resistance, rigidity, impact resistance, scratch resistance, coating properties, adhesion properties, and printability. These problems have been a bar to broadening of application of polypropylene.

In order to improve coating properties, adhesion properties, and printability, it has been proposed to undergo graft-modification of a part or the whole of polypropylene with an unsaturated carboxylic acid or an anhydride thereof, e.g., maleic anhydride, as disclosed, e.g., in JP-B-58-47418 and JP-A-58-49736 (the terms "JP-A" and "JP-B" as used herein mean an "unexamined published Japanese patent application" and an "examined published Japanese patent application", respectively.). However, such modified polypropylene is still unsatisfactory in impact resistance, heat resistance, rigidity, and other physical properties.

For the purpose of improving compatibility between polypropylene and adhesives or coatings, a medium layer called a primer typically comprising, for example, chlorinated polypropylene and toluene is usually provided therebetween. However, because a primer itself is expensive and, also, an additional step should be involved, provision of a primer results in an increase in cost of final products.

Surface pretreatments before coating, printing or adhering which have been proposed to date include sandblasting, treatment with a chromic acid mixed solution, flame treatment, corona discharge treatment, plasma treatment, treatment for introducing a surface functional group, and surface light grafting, but any of these conventional treatments has not achieved satisfactory results as discussed below.

Sandblasting which consists of striking a granular abrasive against a molded article at a high speed to roughen the surface is accompanied by contamination of the working environment or products with the abrasive particles. It is therefore necessary to wash the surface of the sandblasted molded article with water before coating. Moreover, the surface of the article becomes opaque by sandblasting, and the abrasive which has eaten into the surface cannot be removed.

The treatment with a chromic acid mixed solution consists of immersing a molded article in a chromic acid mixed solution comprising 75 parts by weight of potassium bichromate, 120 parts of water, and 1,500 parts of concentrated sulfuric acid heated at about 100° C. for about 5 minutes. This treatment requires a heavy burden in making the waste liquid harmless.

Flame treatment which consists of treating the surface of a molded article with an oxidizing flame of a gas having incorporated therein excess air (1000° to 2500° C.) sometimes causes deformation or fusion of the article by heat.

Corona discharge treatment which consists of passing a film between an electrode and a metallic roll and applying a high voltage thereto cannot be applied to articles other than films.

Plasma treatment which consists of applying a low-temperature plasma onto the plastic surface to induce a chemical change by an ionized gas and ultraviolet rays uses a plasma of oxygen or air. This treatment is disadvantageous in that the cost required for equipment is high.

The treatment of introducing a surface polyfunctional group is carried out by, for example, irradiating ultraviolet rays on the surface of an article in chlorine gas followed by treating with an alkali. Use of chlorine gas constitutes much danger.

Surface light grafting is carried out by, for example, incorporating benzophenone into a polypropylene film and light-graft polymerizing acrylamide in an atmosphere blocked from oxygen. From the economical consideration, this method is disadvantageous in that the steps involved are complicated.

These conventional surface treatments have various problems as discussed above, and there has thus been a strong demand for development of a new technique of surface treatment.

On the other hand, while polyamide resins, polyphenylene ether resins, and saturated polyester resins have been widely used as engineering resins characterized by their heat resistance, rigidity, strength, and oil resistance in the field of automobile parts and electric and electronic parts, there has been a demand for further improvements in moldability, impact resistance, water resistance, and chemical resistance. In addition, these resins have essential disadvantages of higher specific gravity and higher price as compared with polyolefin resins.

Under the above-mentioned situation, a resin composition comprising a polypropylene resin selected from modified polypropylene and a modified polypropylene/polypropylene composition and at least one engineering resin selected from a polyamide resin, a polyphenylene ether resin, and a saturated polyester resin and thereby exhibiting excellent properties characteristic of both resin components is expected to have a broadened application.

Notwithstanding the expectation, a polypropylene resin and the above-mentioned engineering resins have been regarded extremely poor in compatibility and dispersibility with each other. In fact, a mere blend of these resin components has the following defects.

1) The molten polymer blend undergoes a considerable Barus effect, making it nearly impossible to take up an extruded strand in a stable manner, thus remarkably reducing molding workability.

2) The blend is injection molded with extreme non-uniformity only to produce an injection molded product having a poor appearance due to flow marks which withstands no practical use in automobile parts and electric and electronic parts.

3) Molded particles obtained from a blend of a polypropylene resin and a polyamide resin frequently show lower physical properties, and particularly impact resistance and tensile elongation than those expected from synergism of the two resin components.

With the method described in JP-A-61-64741 being followed, while polypropylene and polyamide are essentially incompatible with each other, a polypropylene resin selected from modified polypropylene and a modified polypropylene/polypropylene composition and a polyamide resin can be dispersed together with good compatibility by incorporating thereto an epoxy-containing copolymer to produce a thermoplastic resin composition having well-balanced physical properties, such as moldability, rigidity, heat resistance, impact resistance, scratch resistance, oil resistance, chemical resistance, and water resistance, as well as a uniform and smooth appearance.

SUMMARY OF THE INVENTION

An object of the present invention is to provide a method for surface treating a molded article of the above-described thermoplastic resin composition to provide a molded article excellent in coating properties, adhesion properties, and printability.

Another object of the present invention is to provide a method for coating a molded article of the above-described thermoplastic resin composition.

As a result of extensive investigations with the above objects, the inventors have now found that surface characteristics of the thermoplastic resin composition molded article having well-balanced physical properties and a uniform and smooth appearance can be markedly improved by irradiating the molded article with ultraviolet light having its main wavelength in the region of 300 nm or less and thus reached the present invention.

The present invention relates to a method for surface treating a resin composition molded article, which comprises irradiating a molded article with ultraviolet light having an irradiation wavelength in the region of 300 nm or less, the molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of at least one thermoplastic resin selected from the group consisting of a polyamide resin, a polyphenylene ether resin, a mixture of a polyphenylene ether resin and a styrene resin, a graft copolymer of a polyphenylene ether resin and styrene, and a saturated polyester resin; and (II) up to 30 parts by weight of at least one compatibilizer for improving compatibility between the polypropylene resin (A) and the thermoplastic resin (B), the compatibilizer being selected from the group consisting of an unsaturated carboxylic acid compound having at least one carboxyl group in the molecule thereof or a derivative thereof, a diamine compound having at least two nitrogen atoms in the molecule thereof or a derivative thereof, and an epoxy-containing copolymer.

The present invention also relates to a method of coating the above-described molded article which comprises surface treating the molded article by irradiation with ultraviolet light as described above and coating the thus treated molded article with a coating.

DETAILED DESCRIPTION OF THE INVENTION

Polypropylene resin (A) which can be used in the present invention is a resin selected from the group consisting of polypropylene, modified polypropylene, and a modified polypropylene/polypropylene composition.

The terminology "polypropylene" as used herein means crystalline polypropylene and includes a propylene homopolymer and a block or random copolymer of propylene and other α-olefins, e.g., ethylene and butene-1. The terminology "modified polypropylene" as used herein means the above-described propylene homo- or copolymer to which 0.05 to 20% by weight, preferably 0.1 to 10% by weight, of an unsaturated carboxylic acid or an anhydride thereof is grafted.

Polypropylene resin (A) preferably has a melt index of from 0.1 to 100, and particularly from 0.5 to 40.

The homopolymer or block or random copolymer of propylene can be obtained by polymerization in the presence of, for example, a catalyst system generally called a Ziegler-Natta catalyst which comprises titanium trichloride and an alkylaluminum compound.

Unsaturated carboxylic acids or anhydrides thereof which are grafting monomers used for modifying a propylene homo- or copolymer include acrylic acid, methacrylic acid, maleic acid, itaconic acid, maleic anhydride, and itaconic anhydride, with maleic anhydride being particularly preferred.

Grafting of the grafting monomer to polypropylene can be carried out by various known processes including, for example, a process comprising mixing polypropylene, a grafting monomer, and a radical generator and melt-kneading the mixture in an extruder, a process comprising dissolving polypropylene in an organic solvent, e.g., xylene, and adding a radical generator to the solution in a nitrogen atmosphere to conduct a reaction by heating with stirring, followed by cooling, washing, filtration, and drying, a process comprising irradiating polypropylene with ultraviolet light or radiation in the presence of a grafting monomer, and a process comprising contacting polypropylene with oxygen or ozone in the presence of a grafting monomer.

Thermoplastic resin (B), i.e., engineering resin, which can be used in the present invention is a resin selected from the group consisting of a polyamide resin, a polyphenylene ether resin, a mixture of a polyphenylene ether resin and a styrene resin, a graft copolymer of a polyphenylene ether resin and styrene, and a saturated polyester resin.

The polyamide resin includes those obtained by polycondensation or polymerization of a 3- or more-membered lactam or a polymerizable ω-amino acid or polycondensation between a dibasic acid and a diamine. Such polyamide resins include polymers of ε-caprolactam, aminocaproic acid, enantholactam, 7-aminoheptanoic acid, 11-aminoundecanoic acid, etc.; polymers obtained by polycondensation between a diamine, e.g., hexamethylenediamine, nonamethylenediamine, undecamethylenediamine, dodecamethylenediamine, and m-xylenediamine, and a dicarboxylic acid, e.g., terephthalic acid, isophthalic acid, adipic acid, sebacic acid, dodecane dibasic acid, glutaric acid, etc.; and copolymers thereof.

Specific examples of these polyamide resins are aliphatic polyamide, e.g., polyamide 6, polyamide 6.6, polyamide 6.10, polyamide 11, polyamide 12, and polyamide 6.12; and aromatic polyamide, e.g., polyhexamethylenediamine terephthalamide, polyhexamethylenediamine isophthalamide, and xylene-containing polyamide. These polyamide resins may be used individually or in combination of two or more thereof either in the form of a mixture thereof or a copolymer thereof.

The polyphenylene ether resin is a polymer obtained by oxidatively polymerizing at least one phenol compound represented by formula:

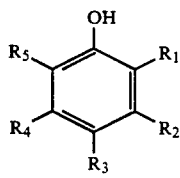

wherein $R_1$, $R_2$, $R_3$, $R_4$, and $R_5$ each represent a hydrogen atom, a halogen atom, a hydrocarbon group, or a substituted hydrocarbon group, provided that at least one of them is a hydrogen atom, in oxygen or an oxygen-containing gas in the presence of a catalyst for oxidative coupling.

In the above formula, $R_1$, $R_2$, $R_3$, $R_4$, or $R_5$ represents a hydrogen atom, a chlorine atom, a bromine atom, a fluorine atom, an iodine atom, a methyl group, an ethyl group, an n- or iso-propyl group, a pri-, sec- or t-butyl group, a chloroethyl group, a hydroxyethyl group, a phenylethyl group, a benzyl group, a hydroxymethyl group, a carboxyethyl group, a methoxycarbonylethyl group, a cyanoethyl group, a phenyl group, a chlorophenyl group, a methylphenyl group, a dimethylphenyl group, an ethylphenyl group, and an allyl group.

Specific examples of the phenol compound represented by the above formula include phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6- or 2,4,6-trimethylphenol, 3-methyl-6-t-butylphenol, thymol, and 2-methyl-6-allylphenyl.

In addition, copolymers of the above-enumerated phenol compound and other phenol compounds, such as polyhydric aromatic compounds, e.g., bisphenol A, tetrabromobisphenol A, resorcin, hydroquinone, and a novolak resin, are also employable.

Preferred of the polyphenylene ether resins are a homopolymer of 2,6-dimethylphenol or 2,6-diphenylphenol and a copolymer of 2,6-dimethylphenol as a major component and 3-methyl-6-t-butylphenol or 2,3,6-trimethylphenol as a minor component. More preferred is a 2,6-dimethylphenol homopolymer, i.e., poly(2,6-dimethyl-1,4-phenylene)ether.

The catalyst for oxidative coupling which can be used in oxidative polymerization of the phenol compound is not particularly limited, and any catalyst capable of catalyzing polymerization is usable. Typical examples of such a catalyst include those composed of a cuprous salt and a tertiary amine, e.g., cuprous chloride-triethylamine and cuprous chloridepyridine; those composed of a cupric salt, an amine, and an alkali metal hydroxide, e.g., cupric chloride-pyridinepotassium hydroxide; those composed of a manganese salt and a primary amine, e.g., manganese chloride-ethanolamine and manganese acetate-ethylenediamine; those composed of a manganese salt and an alcoholate or phenolate, e.g., manganese chloride-sodium methylate and manganese chloride-sodium phenolate; and those composed of a cobalt salt and a tertiary amine.

It is known that polyphenylene ethers obtained by oxidative polymerization have physical properties varying depending on whether the oxidative polymerization is conducted at a temperature higher than 40° C. (high temperature polymerization) or at a temperature no higher than 40° C. (low temperature polymerization). In the present invention, either of high temperature polymerization and low temperature polymerization can be adopted.

The polyphenylene ether resin which can be used in the present invention also includes polyphenylene ethers to which a styrene polymer or other polymers are grafted. Processes for producing such grafted polyphenylene ether resins include a process in which a styrene monomer and/or other polymerizable monomers are graft-polymerized in the presence of a polyphenylene ether and an organic peroxide as described in JP-B-47-47862, JP-B-48-12197, JP-B-49-5623, JP-B-52-38596, and JP-B-52-30991; and a process in which the above-described polyphenylene ether, a styrene polymer, and a radical generator are melt-kneaded as described in JP-A-52-142799.

The styrene resin which can be used in the present invention is a polymer comprising at least one polymer unit selected from styrene, α-methylstyrene, p-methylstyrene, etc. Examples of such a styrene resin include polystyrene, rubber-reinforced polystyrene, poly-α-methylstyrene, poly-p-methylstyrene, and a styrene-acrylonitrile copolymer.

The saturated polyester resin which can be used in the present invention consists of a dicarboxylic acid component, at least 40 mol % of which being terephthalic acid, and a diol component. Dicarboxylic acid components other than terephthalic acid include an aliphatic dicarboxylic acid having from 2 to 20 carbon atoms, e.g., adipic acid, sebacic acid, and dodecanedicarboxylic acid, an aromatic dicarboxylic acid, e.g., isophthalic acid and naphthalenedicarboxylic acid, and an alicyclic dicarboxylic acid, e.g., cyclohexanedicarboxylic acid, or a mixture thereof.

Of these saturated polyester resins, polybutylene terephthalate and polyethylene terephthalate are particularly effective for manifestation of the effects of the present invention.

The saturated polyester resin preferably has an intrinsic viscosity ranging from 0.5 to 3.0 dl/g as measured in o-chlorophenol at 25° C. With a saturated polyester resin whose intrinsic viscosity is out of this range, desired mechanical strength can hardly be obtained.

Compatibilizer (II) which can be used in the present invention is selected from an unsaturated carboxylic acid compound or a derivative thereof, an amine compound or a derivative thereof, and an epoxy-containing copolymer.

Examples of the unsaturated carboxylic acid compound includes acrylic acid, methacrylic acid, maleic acid, itaconic acid, citraconic acid, endo-cis-bicyclo[2,2,1]hept-5-ene-2,3-dicarboxylic acid, bicyclo[2,2,2]oct-5-en-2,3-dicarboxylic acid, 4-methylcyclohex-4-en-1,2-dicarboxylic acid, 1,2,3,4,5,8,9,10-octahydronaphthalene-2,3-dicarboxylic acid, bicyclo[2,2,-

1]oct-7-en-2,3,5,6-tetracarboxylic acid, and 7-oxabicyclo[2,2,1]hep-5-en-2,3-dicarboxylic acid. Derivatives of the unsaturated carboxylic acid compound include acid anhydrides, esters, amides, imides, and metal salts. Specific examples of such derivatives are maleic anhydride, itaconic anhydride, citraconican hydride, endo-cis-bicyclo[2,2,1]hept-5-ene-2,3-dicarboxylic anhydride, monoethyl maleate, monomethyl fumarate, monomethyl itaconate, monomethyl fumarate, dimethylaminoethyl methacrylate, dimethylaminopropyl acrylamide, acrylamide, methacrylamide, maleic acid monoamide, maleic acid diamide, maleic acid N-monoethylamide, maleic acid N,N-diethylamide, maleic acid N-monobutylamide, maleic acid N,N-dibutylamide, fumaric acid monoamide, fumaric acid diamide, fumaric acid N-monoethylamide, fumaric acid N>N-diethylamide, fumaric acid N-monobutylamide, fumaric acid N,N-dibutylamide, maleimide, N-butylmaleimide, N-phenylmaleimide, sodium acrylate, sodium methacrylate, potassium acrylate, and potassium methacrylate. The most preferred of these unsaturated carboxylic acid compounds and derivatives thereof is maleic anhydride.

The amine compound containing at least two nitrogen atoms in the molecule thereof or a derivative thereof includes hexamethylenediamine, hexamethylenetetramine, a polyalkylenepolyamine, phenylenediamine, 4,4'-diaminodiphenol compound, m-xylenediamine; toluidine derivatives, e.g., aniline, an N-alkylaniline, and phenylaniline; and urea (CO(NH$_2$)$_2$) or a derivative thereof, e.g., methylurea, sym-diethylurea, ethylurea, sym-dimethylurea, unsym-diethylurea, acetylurea, acetylmethylurea, sym-ethylphenylurea, phenylurea, symdiphenylurea, benzylurea, tetraphenylurea, benzoylurea, p-ethoxyphenylurea, ethyleneurea, thiourea, allylthiourea, symdimethylthiourea, sym-diethylthiourea, sym-diphenylthiourea, phenylthiourea, benzylthiourea, s-benzylisothiourea, and benzoylthiourea.

The epoxy-containing copolymer is a copolymer comprising an unsaturated epoxy compound and an ethylenically unsaturated compound.

The copolymerization composition of the epoxy-containing copolymer is not particularly limited, but a preferred content of the unsaturated epoxy compound unit is from 0.1 to 50% by weight, and more preferably from 1 to 30% by weight.

The unsaturated epoxy compound is a compound containing an unsaturated group copolymerizable with an ethylenically unsaturated compound and an epoxy group per molecule. Such a compound includes unsaturated glycidyl esters and unsaturated glycidyl ethers represented by formulae (1) and (2) shown below:

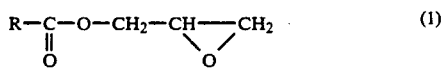
(1)

wherein R represents a hydrocarbon group having from 2 to 18 carbon atoms and containing an ethylenically unsaturated bond.

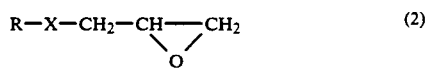
(2)

wherein R is as defined above; and X represents —CH$_2$—O— or

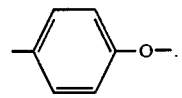

Specific examples of the unsaturated epoxy compound are glycidyl acrylate, glycidyl methacrylate, glycidyl itaconate, acryl glycidyl ether, 2-methylallyl glycidyl ether, and styrene p-glycidyl ether.

The ethylenically unsaturated compound includes olefins, vinyl esters of saturated carboxylic acids having from 2 to 6 carbon atoms, esters of a saturated alcohol component having from 1 to 8 carbon atoms and acrylic acid or methacrylic acid, maleic acid esters, methacrylic acid esters, fumaric acid esters, vinyl halides, styrenes, nitriles, vinyl ethers, and acrylamides.

Specific examples of the ethylenically unsaturated compound are ethylene, propylene, butene-1, vinyl acetate, methyl acrylate, ethyl acrylate, methyl methacrylate, diethyl maleate, diethyl fumarate, vinyl chloride, vinylidene chloride, styrene, acrylonitrile, isobutyl vinyl ether, and acrylamide, with ethylene being particularly preferred.

The epoxy-containing copolymer can be obtained by various techniques. Either a random copolymerization process in which an unsaturated epoxy compound is introduced into the main chain of a copolymer or a graft copolymerization process in which an unsaturated epoxy compound is introduced to a side chain of a copolymer can be employed. More specifically, the epoxy-containing copolymer can be prepared by a process in which an unsaturated epoxy compound and ethylene are copolymerized in the presence of a radical generator under a pressure of from 500 to 4,000 atm at a temperature of from 100° to 300° C. with or without an appropriate solvent or a chain transfer agent; a process in which polypropylene is mixed with an unsaturated epoxy compound and a radical generator, and the mixture is subjected to graft copolymerization in a molten state in an extruder; and a process in which an unsaturated epoxy compound and an ethylenically unsaturated compound are copolymerized in an inert solvent, e.g., water and an organic solvent, in the presence of a radical generator.

For the purpose of improving impact resistance, particularly low temperature impact resistance of the resin composition comprising polypropylene resin (A), thermoplastic resin (B), and compatibilizer (II) may contain rubbery substance (IV) or modified rubbery substance (V).

Rubbery substance (IV) includes an ethylene copolymer rubber, a propylene-butene rubber, an isoprene-butylene rubber, polyisoprene, polybutadiene, a styrene block copolymer (e.g., a styrene-butadiene copolymer rubber, a styrene-butadienestyrene block copolymer, a partially hydrogenated styrenebutadiene block copolymer, a styrene-isoprene block copolymer, and a partially hydrogenated styrene-isoprene block copolymer), and linear low-density polyethylene; and a blend of these rubbery substances.

The ethylene copolymer rubber includes ethylene-α-olefin copolymer rubbers, e.g., an ethylene-propylene copolymer rubber (hereinafter abbreviated as EPM), ethylene-α-olefin-non-conjugated diene copolymer rubbers, e.g., an ethylenepropylene-non-conjugated diene copolymer rubber (hereinafter abbreviated as EPDM), an ethylene-vinyl acetate copolymer, an ethylene-methyl (meth)acrylate copolymer, an ethylene-ethyl (meth)acrylate copolymer, an ethylene-butyl (meth)acrylate copolymer, an ethylene-(meth)acrylic acid or a partial metal salt thereof, an ethylene-(meth)acrylic acid-(meth)acrylic ester copolymer, an ethylene-vinyl alcohol copolymer, an ethylene-vinyl acetate-vinyl alcohol copolymer, and an ethylene-styrene copolymer. These ethylene copolymers may be used as a mixture of two or more thereof. Low-density polyethylene or high-density polyethylene which is compatible with these ethylene copolymer rubbers may be used in combination.

Modified rubbery substance (V) can be obtained by a process in which the above-described rubbery substance (IV) is graft copolymerized with an unsaturated carboxylic acid or a derivative thereof or a combination of an unsaturated carboxylic acid or a derivative thereof and an unsaturated monomer in the presence or absence of a radical initiator, or a process in which an unsaturated carboxylic acid or a derivative thereof is directly copolymerized into the main chain of an α-olefin in the presence of a polymerization initiator and a catalyst.

Rubbery substances serving as rubbery substance (IV) and also serving as a raw material of modified rubbery substance (V) preferably include an ethylene copolymer rubber and a styrene block copolymer.

Preferred of the ethylene copolymer rubbers are ethylene-α-olefin copolymer rubbers and ethylene-α-olefin-non-conjugated diene copolymer rubbers. The ethylene-α-olefin copolymer rubbers include copolymers of ethylene and other α-olefins, e.g., propylene, 1-butene, 1-pentene, 1-hexene, 4-methyl-1-pentene, and 1-octene, and terpolymer rubbers, e.g., an ethylene-propylene-1-butene copolymer, with an ethylenepropylene copolymer rubber (EPM) and an ethylene-1-butene copolymer rubber being preferred. The ethylene-α-olefin-non-conjugated diene copolymer rubbers preferably have a non-conjugated diene content of not more than 3% by weight. Otherwise, gelation is liable to take place on kneading.

The ethylene-α-olefin copolymer rubbers have an ethylene content of from 15 to 85% by weight, and preferably from 40 to 80% by weight. Highly crystalline ethylene copolymers having an ethylene content of more than 85% by weight have difficulty in processing under conditions generally employed for rubber molding. Those having an ethylene content of less than 15% by weight have an increased glass transition temperature (Tg) and lose rubber-like characteristics.

The ethylene-α-olefin copolymer rubbers preferably have a number average molecular weight which permits of kneading in an extruder, usually ranging from 10,000 to 100,000. Too a low molecular weight makes handling in feeding to an extruder difficult. Too a high molecular weight reduces fluidity, making processing difficult.

The molecular weight distribution of the ethylene-α-olefin copolymer rubbers is not also restricted, and any of generally produced and commercially available copolymer rubbers having various types of molecular weight distribution including a monomodal type and a bimodal type can be used.

A Q value of molecular weight distribution (i.e., weight average molecular weight/number average molecular weight) preferably ranges from 1 to 30, and more preferably from 2 to 20.

The above-described copolymer rubbers can be produced by using a generally employed catalyst called a Ziegler-Natta catalyst, such as a combination of an organoaluminum compound and a tri- to pentavalent vanadium compound soluble in a hydrocarbon solvent. The organoaluminum compound includes an alkylaluminum sesquichloride, a trialkylaluminum, a dialkylaluminum monochloride, and a mixture thereof. The vanadium compound includes vanadium oxytrichloride, vanadium tetrachloride, and vanadate compounds represented by formula $VO(OR^8)_q X_{3-q}$, wherein $0 < q \leq 3$, and $R^8$ is a straight chain, branched or cyclic hydrocarbon group having from 1 to 10 carbon atoms.

Of the styrene block copolymers, preferred is a partially hydrogenated styrene-butadiene block copolymer. The partially hydrogenated styrene-butadiene block copolymer is prepared by partial hydrogenation of a styrene-butadiene block copolymer as hereinafter described.

The partially hydrogenated styrene-butadiene block copolymer preferably has a total number average molecular weight of from 10,000 to 1,000,000, more preferably from 20,000 to 300,000, and comprises unsaturated aromatic polymer blocks A having a number average molecular weight of from 1,000 to 200,000, preferably from 2,000 to 100,000, and a conjugated diene polymer blocks B having a number average molecular weight of from 1,000 to 200,000, preferably from 2,000 to 100,000, at a A to B weight ratio of from 2/98 to 60/40, preferably from 10/90 to 40/60.

Many processes for producing the block copolymer rubbers have been proposed to date. According to the typical process disclosed in JP-B-40-23798, an unsaturated aromatic hydrocarbon-diene hydrocarbon block copolymer rubber can be obtained by block copolymerization in an inert solvent in the presence of a lithium catalyst or a Ziegler catalyst.

Hydrogenation treatment of the block copolymer rubber can be carried out in an inert solvent in the presence of a catalyst for hydrogenation as described in JP-B-42-8704, JP-B-43-6636, and JP-B-46-20814. By the hydrogenation, at least 50%, preferably at least 80%, of block B and not more than 25% of the aromatic unsaturated bond in block A are hydrogenated. Such a partially or completely hydrogenated block copolymer is commercially available, typically from Shell Chemical Co., U.S.A. under the trade name of KRATON-G.

In the production of modified rubbery substance (V), graft copolymerization of a grafting monomer to a starting rubbery substance can be performed by various known processes. Usable processes include a process in which a starting rubbery substance, a grafting monomer, and a radical initiator are mixed, and the mixture is melt-kneaded in a melt-kneading apparatus to conduct grafting; a process in which an ethylene copolymer rubber is dissolved in an organic solvent, e.g., xylene, and adding a radical generator to the solution in a nitrogen atmosphere to conduct a reaction by heating with stirring, followed by cooling, washing, filtration, and drying to obtain a grafted ethylene copolymer rubber; a process comprising irradiating an ethylene copolymer rubber with ultraviolet light in the presence of a grafting monomer; and a process comprising contacting a rubbery substance with oxygen or ozone in the presence of a grafting monomer. From the economical consideration, the process comprising graft copolymerizing in a molten state in a melt-kneading apparatus is the most preferred.

More specifically, modified rubbery substance (V) can be obtained by melt-kneading a starting rubbery substance, an unsaturated carboxylic acid or a derivative thereof and, if necessary, a radical initiator and, if desired, an unsaturated aromatic monomer at a temperature of from 200° to 280° C., preferably from 230° to 260° C., for a retention time of from 0.2 to 10 minutes, though the retention time varying depending on the kind of the radical initiator used, in a kneading machine, e.g., an extruder, a Banbury mixer, and a kneader.

It is desirable to conduct kneading in an atmosphere substantially free from oxygen because the copolymerization system is apt to undergo gel formation or considerable coloring during kneading if too much oxygen is present.

If the kneading temperature is lower than 200° C., the unsaturated carboxylic acid anhydride cannot be added to a desired rate, and the effect to increase the rate of grafting is small. If the kneading temperature is higher than 280° C., the effect to increase the rate of grafting is also small. Under such a temperature condition, the system undergoes gel formation, coloring, and the like in some cases.

Kneading machines which can be used for modification are not particularly limited. In general, an extruder is preferably used considering that continuous production is feasible. A single- or twin-screw extruder is preferred for uniformly mixing raw materials fed.

In order to remove unreacted materials, such as the unsaturated carboxylic acid or a derivative thereof, the unsaturated aromatic monomer, the radical initiator, etc., and by-products, such as oligomers or decomposition products of these unreacted materials, a vent connected to a vacuum pump may be provided in the midway or in the vicinity of the exit of the extruder, or the reaction product may be purified by dissolving in an appropriate solvent followed by precipitation. Further, the reaction product may be subjected to a heat treatment at a temperature of 60° C. or higher, or a vacuum may be drawn in a molten state.

The above-described three or four components may be fed to a kneading machine separately, or a part or the whole of the components may be uniformly mixed beforehand. For example, the rubbery substance may be previously impregnated with the unsaturated aromatic monomer together with a radical initiator, and the thus impregnated rubbery substance and the unsaturated carboxylic acid or its derivative are simultaneously fed to a kneading machine. The radical initiator and/or the unsaturated carboxylic acid or its derivative may be fed in the midway of an extruder.

If desired, various additives may be added to modified rubbery substance (V) during the preparation or succeeding processing steps. Additives which can be used include anti-oxidants, thermal stabilizers, light stabilizers, nucleating agents, lubricants, antistatic agents, organic or inorganic colorants, rust inhibitors, crosslinking agents, blowing agents, plasticizers, fluorescent agents, surface smoothening agents, gloss-improving agents, and so on.

The unsaturated carboxylic acid inclusive of its derivative and the radical initiator which can be used for the production of modified rubbery substance (V) can be arbitrarily selected from the compounds used for the production of grafted polypropylene (A). The unsaturated aromatic monomer includes styrene, o-methylstyrene, p-methylstyrene, α-methylstyrene, vinyltoluene, and divinylbenzene, with styrene being the most preferred. These monomers may be used as a mixture thereof.

In the production of modified rubbery substance (V), the unsaturated aromatic monomer is used for the purpose of preventing gel formation and improving grafting rate. The unsaturated aromatic monomer is preferably used in an amount of from 0.2 to 20 parts by weight per 100 parts by weight of a starting rubbery substance. The unsaturated carboxylic acid or a derivative thereof is preferably used in an amount of from 0.5 to 15 parts by weight per 100 parts by weight of a starting rubbery substance. In cases where an aromatic monomer is used, the unsaturated carboxylic acid or a derivative thereof is preferably used in an amount of from 0.5 to 15 parts by weight, with a weight ratio of unsaturated aromatic monomer to unsaturated carboxylic acid (inclusive of its derivative) being preferably from 0.1 to 3.0, and more preferably from 0.5 to 2.0.

If the unsaturated aromatic monomer to unsaturated carboxylic acid weight ratio is less than 0.1, no effect on prevention of gel formation and improvement of grafting rate cannot be exerted. If the weight ratio exceeds 3.0, no further improvement is obtained.

The amount of the radical initiator to be used usually ranges from 0.005 to 1.0 part by weight, and preferably from 0.01 to 0.5 part by weight, per 100 parts by weight of a starting rubbery substance, though varying more or less depending on the kind and kneading conditions. With less than 0.005 part by weight of the initiator, the unsaturated carboxylic acid or a derivative thereof cannot be added to a desired rate, or the unsaturated aromatic monomer used in combination cannot produce a sufficient effect to increase the addition amount of the unsaturated carboxylic acid or a derivative thereof. If the amount of the initiator exceeds 1.0 part, gel formation is induced.

The thus obtained modified rubbery substance (V) has added thereto from 0.1 to 5% by weight of the unsaturated carboxylic acid or a derivative thereof, and preferably has added thereto from 0.1 to 5% by weight of the unsaturated aromatic monomer, and preferably has a Mooney viscosity ($ML_{1+4}$ 120° C.) of from 5 to 120.

Modified rubbery substance (V) can be alternatively produced by a process in which copolymerization is conducted in the presence of a polymerization initiator and a catalyst to introduce a modifying comonomer into a main polymer chain. In this case, a modified rubbery substance can generally be prepared by a known high-pressure radical polymerization process in which ethylene and a radical copolymerizable monomer (comonomer) are copolymerized in the presence of a free radical generating reagent, such as organic peroxides and oxygen. The copolymerization reaction is usually carried out at a temperature of from 130° to 300° C. under a pressure of from 500 to 3,000 kg/cm$^2$.

Suitable radical copolymerizable monomers include unsaturated carboxylic acids, e.g., acrylic acid and methacrylic acid, and esters thereof, e.g., methyl acrylate, ethyl acrylate, methyl methacrylate, and glycidyl methacrylate, and vinyl esters, e.g., vinyl acetate. These comonomers may be used either individually or in combination of two or more thereof.

Modified rubbery substance (V) obtained by direct copolymerization contains from 0.1 to 40% by weight, and preferably from 1 to 35% by weight, of the comonomer. If the comonomer content is less than 0.1% by weight, no modifying effects can be obtained.

From the above-described copolymers are excluded ethylene copolymer rubbers which have been illustrated above as examples of rubbery substance (IV) and the starting rubbery substance of modified rubbery substance (V). Preferred among these copolymers are an ethylene-acrylic acid copolymer and an ethylene-methacrylic acid copolymer.

The resin composition according to the present invention may further contain (III) an inorganic filler and/or glass fiber.

Suitable inorganic fillers which can be used in the present invention include talc (magnesium silicate), clay (aluminum silicate), zinc oxide, titanium oxide, and calcium carbonate, with talc being preferred. The inorganic filler preferably has an average particle size of not more than 5.0 μm, and more preferably has an aspect ratio of not less than 5. While the inorganic filler may be used as untreated, it can be subjected to surface treatment with various silane coupling agents, titanium coupling agents, higher fatty acids, higher fatty acid esters, higher fatty acid amides, higher fatty acid salts or other surface active agents for the purpose of improving interfacial adhesion to the polyamide resin, polyphenylene ether resin, saturated polyester resin, etc. or for the purpose of improving dispersibility.

Glass fiber can be used either alone or in combination with the inorganic filler. In order to improve interfacial adhesion to the polyamide resin, polyphenylene ether resin, saturated polyester resin, etc. or to improve dispersibility, glass fiber can be used in combination with various coupling agents generally including silane coupling agents and titanium coupling agents.

The thermoplastic resin composition according to the present invention comprises 100 parts by weight of resin composition (I) comprising polypropylene resin (A) and thermoplastic resin (B) selected from a polyamide resin, a polyphenylene ether resin, and a saturated polyester resin, and from 0 to 30 parts by weight of at least one compatibilizer (II) selected from an unsaturated carboxylic acid compound or a derivative thereof, an amine compound having at least two nitrogen atoms in the molecule thereof or a derivative thereof, and an epoxy-containing copolymer.

Resin composition (I) contains from 5 to 99.5%, preferably from 10 to 95%, and more preferably from 20 to 80%, by weight of polypropylene resin (A). If the amount of polypropylene resin (A) is less than 5% by weight, moldability, toughness, water resistance and chemical resistance of the resin composition are insufficient. If it exceeds 99.5% by weight, favorable properties in terms of heat resistance, strength and rigidity cannot be obtained.

Where a modified polypropylene/polypropylene composition is used as resin component (A), the modified polypropylene should be present in such a composition in a proportion of at least 5% by weight. If the proportion of the modified polypropylene is less than 5% by weight, the finally obtained resin composition has insufficient compatibility or dispersibility, failing to exhibit sufficient toughness, sufficient impact resistance, improved coating properties, improved adhesion properties, and improved printability.

The proportion of resin component (B) in resin composition (I) is from 0.5 to 95%, preferably from 5 to 90%, and more preferably from 20 to 80%, by weight. If it is less than 0.5% by weight, coating properties, heat resistance, rigidity and strength of the resulting resin composition are insufficient. If it exceeds 95% by weight, favorable properties in terms of moldability, toughness, water resistance, and chemical resistance cannot be obtained.

Compatibilizer (II) selected from an unsaturated carboxylic acid compound having a carboxyl group in the molecule thereof or a derivative thereof, an amine compound having at least two nitrogen atoms in the molecule thereof or a derivative thereof, and an epoxy-containing copolymer is added in a total amount of up to 30 parts by weight per 100 parts by weight of the sum of polypropylene resin (A) and thermoplastic resin (B). If the amount of compatibilizer (II) exceeds 30 parts by weight, the resulting molded article suffers from layer separation and a reduction in rigidity, toughness, and impact resistance.

The amount of rubbery substance (IV) or modified rubbery substance (V) which is used for improving impact resistance, particularly low-temperature impact resistance of the thermoplastic resin composition is up to 100 parts by weight, and preferably from 1 to 70 parts by weight, per 100 parts by weight of resin composition (I) comprising polypropylene resin (A) and thermoplastic resin (B). If it exceeds 100 parts by weight, the resulting resin composition suffers from a reduction in toughness and heat resistance.

The inorganic filler or glass fiber (III) is added in an amount of up to 50 parts by weight. The resin composition containing neither inorganic filler nor glass fiber has inferior heat resistance, rigidity and dimensional stability but has improved impact strength. Addition of 50 parts or more of the inorganic filler and/or glass fiber results in a considerable reduction in impact resistance. A preferred amount of the inorganic filler and/or glass fiber is up to 30 parts by weight. Where the inorganic filler and glass fiber are used in combination, the proportion of the former is from 20 to 80% by weight, and that of the latter is from 80 to 20% by weight.

If desired, the thermoplastic resin composition according to the present invention may further contain pigments, ultraviolet absorbents, heat stabilizers, flame retardants, antioxidants, plasticizers, and the like.

The thermoplastic resin composition of the present invention can be prepared by any known techniques without any particular limitation. For example, the thermoplastic resin composition is prepared by mixing the above-described constituting components in a dissolved state, followed by solvent removal by evaporation or precipitation in a nonsolvent. From the industrial viewpoint in practice, a process comprising kneading the components in a molten state is usually taken. Melt-kneading can be performed by means of a commonly employed kneading machine, e.g., a Banbury mixer, an extruder, a roll, and various kneaders.

It is preferable that the resin components are preliminarily mixed uniformly in the form of a powder or pellet in a mixing apparatus, e.g., a tumbling mixer and a Henschel mixer. If necessary, preliminary mixing may be omitted, and each resin component may be separately fed to a kneading machine.

The resulting resin composition is molded by various molding methods, such as injection molding and extrusion molding. The present invention also embraces an embodiment in which the constituting components are dry blended at the time of injection molding or extrusion molding without having been previously kneaded and directly kneaded during a melt-molding operation to obtain a molded article.

The order of kneading the constituting components is not particularly limited. That is, the components are kneaded in any of the following manner: (1) all the components including polypropylene resin (A), thermoplastic resin (B), compatibilizer (II), inorganic filler and/or glass fiber (III), and rubbery substance (IV) and/or modified rubbery substance (V) are mixed together all at once simultaneously with melt-kneading; (2) polypropylene resin (A) and compatibilizer (II) are previously melt-kneaded in the presence or absence of a radical initiator, and the remaining components (B), (III), and (IV) and/or (V) are added thereto, followed by melt-kneading; (3) components (A), (II), and (IV) and/or (V) are previously melt-kneaded in the presence or absence of a radical initiator, and components (B) and (III) are then added thereto either separately or as a molten mixture thereof, followed by melt-kneading; (4) components (A), (II), (III), and (IV) and/or (V) are previously melt-kneaded in the presence or absence of a radical initiator, and component (B) is then added thereto, followed by melt-kneading; and (5) components (A), (II), and (IV) and/or (V) are previously melt-kneaded in the presence or absence of a radical initiator, component (B) is added thereto and kneaded, and component (III) is then added and kneaded.

The method for surface treating and coating a molded article obtained from the above-described resin composition is hereinafter explained.

In the present invention, the surface of the thermoplastic resin molded article is irradiated with ultraviolet light. The molded article may have various forms, such as films, plates, fibers, etc.

Light to be irradiated is light having a wavelength of 300 nm or less, and particularly ultraviolet light containing rays having wavelengths of 254 nm and 185 nm as main working wavelengths. The higher the intensity, the better.

It is preferable to degrease the surface of the molded article in a usual manner before irradiation of ultraviolet light. Suitable degreasing agents which can be used include water, an aqueous solution of an alkali, etc., an alcohol, e.g., ethanol and isopropyl alcohol, and an aromatic hydrocarbon solvent, e.g., toluene and xylene. The degreasing agent is applied to the surface of the molded article by coating, wiping, soaking, or spraying.

The time of ultraviolet irradiation is from 20 seconds to 10 minutes, and preferably from 30 seconds to 5 minutes. If it is shorter than 20 seconds, sufficient improvements in coating properties, adhesion properties, and printability cannot be obtained. An irradiation time of longer than 10 minutes not only is uneconomical but causes deterioration of the resin surface.

The thus irradiated molded article can be coated with a coating. Examples of suitable coatings which can be used in the present invention include epoxy coatings, polyester coatings, acrylic coatings, and urethane coatings. In particular, urethane coatings have softness and are largely used in automobile parts and motorbike parts. Examples of suitable urethane coatings are acrylic urethane, polyesterurethane, and other coatings having a urethane structure, e.g., modified urethane.

The present invention is now illustrated in greater detail with reference to Examples, but it should be understood that the present invention is not deemed to be limited thereto. All the percents, parts, and ratios are by weight unless otherwise indicated.

Raw Materials

The modified polypropylene and epoxy-containing copolymer were prepared by the processes described below. Polypropylene and polyamide resins used were those commercially available.

1) Modified Polypropylene

The process described in JP-B-56-9925 was referred to. Polypropylene, maleic anhydride, and t-butyl peroxylaurate were mixed, and the mixture was fed from a hopper to an extruder (screw diameter: 30 mm; L/D: 28) set at a barrel temperature of 230° C. and kneaded at a screw speed of 60 r.p.m. The modified polypropylene molten strand extruded from the die was cooled with water and pelletized.

2) Polypropylene (i) Sumitomo Noblen ® FS 1012, a propylene homopolymer produced by Sumitomo Chemical Company, Limited (Melt Index=8 g/10 min.)

(ii) Sumitomo Noblen ® W 501, a propylene homopolymer produced by Sumitomo Chemical Company, Limited (Melt Index=1 g/10 min.)

(iii) Sumitomo Noblen ® WF 299B, a propylene homopolymer produced by Sumitomo Chemical Company, Limited (Melt Index=1.6 g/10 min.)

The melt index values were measured according to ASTM D-1238.

3) Polyamide Resin:

Polyamide 6:

(i) Nylon A-1025 produced by Unitika Ltd. (hereinafter referred to as PA-1): relative viscosity (measured according to JIS K6810, 98% sulfuric acid method, hereinafter the same): 2.3; amounts of functional group at terminals (measured by neutralization titration, hereinafter the same): 71 mmol/kg of amino group; 71 mmol/kg of carboxyl group.

(ii) Nylon A-1020 BRL produced by Unitika Ltd. (hereinafter referred to as PA-2): relative viscosity: 2.1; 84 mmol/kg of amino group, 84 mmol/kg of carboxyl group.

(iii) Nylon A-1030A produced by Unitika Ltd. (hereinafter referred to as PA-3): relative viscosity: 2.35; 94 mmol/kg of amino group, 54 mmol/kg of carboxyl group.

4) Polyphenylene Ether Resin 2,6-Dimethylphenol was dissolved in toluene and methanol, and manganese chloride-ethylenediamine was added thereto. The mixture was subjected to oxidative polymerization at 30° C. in an oxidative atmosphere to obtain a polyphenylene ether resin.

5) Saturated Polyester Resin

Toughpet ® PBT N 1000, polybutylene terephthalate produced by Mitsubishi Rayon Co., Ltd.

6) Compatibilizer (i) Commercially available maleic anhydride
(ii) Commercially available 1,12-diaminododecane
(iii) A glycidyl mathacrylate-ethylene-vinyl acetate copolymer as an epoxy-containing copolymer was prepared as follows by referring to the process described in JP-A-47-23490 and JP-A-48-11388.

Glycidyl methacrylate, ethylene, vinyl acetate, a radical initiator, and a chain transfer agent were continuously fed to a 40 l-volume stainless steel reactor equipped with an appropriate inlet for feeding, an outlet for withdrawal, a stirrer, and a temperature controller to conduct copolymerization at a temperature of from 180° to 200° C. under a pressure of from 1,400 to 1,600 atm while stirring.

7) Modified Rubbery Substance

Modified ethylene-propylene copolymer:

A hundred parts of an ethylene-propylene copolymer rubber having a number average molecular weight of 60,000 and an ethylene content of 78% was mixed with 2.0 parts of maleic anhydride, and 1.0 part of a propylene homopolymer having carried thereon 8% of 1,3-bis(t-butylperoxyisopropyl)benzene (Sunperox ® TY 1,3, produced by Sanken Chemical Industrial Co., Ltd.) as a radical initiator in a Henschel mixer. The resulting mixture was melt-kneaded in a twin-screw extruder ("TEX 44 SS-30BW-2V" produced by The Japan Steel Works, Ltd.) in a nitrogen atmosphere at a kneading temperature of 250° C. at an output of 18 kg/hour to obtain a modified ethylene-propylene copolymer rubber having a maleic anhydride content of 0.7% and a Mooney viscosity ($ML_{1+4}$ 121° C.) of 72.

8) Inorganic Filler

Microace ® P132, ultrafine talc powder produced by Nippon Talc K. K., having a 50% mean particle diameter $D_{50}$ of 2.1 μm as measured under the following conditions.

Measuring Instrument:

centrifugal sedimentation type particle size distribution measuring apparatus produced by Shimadzu Corporation, Model SA-CP 2-20

Number of Revolutions: 500 r.p.m:

Height of Liquid Level: 3

$D_{50}$ was obtained from the plot according to an undersize method.

Evaluation

Coating properties of the molded articles obtained were evaluated in terms of initial adhesive strength according to the following test method.

The surface of a molded article was coated with a coating, and the coating was crosshatched with a razor blade to make 100 (10×10) 2-mm squares. A 24 mm wide adhesive tape ("Cello Tape ®" produced by Nichiban Company, Limited) was pressed on the coating with fingers, and one end of the tape was stripped straight out. The number of squares remaining on the molded article was counted to obtain a retention (%).

EXAMPLE 1

A propylene homopolymer ("Sumitomo Noblen ® FS 1012" produced by Sumitomo Chemical Company, Limited) as a base resin was modified with maleic anhydride to obtain modified polypropylene having grafted thereto 0.11% of maleic anhydride.

The resulting modified polypropylene, PA-1 as a polyamide resin, and a glycidyl methacrylate-ethylene-vinyl acetate copolymer (copolymerization ratio: 10/85/5) were preliminarily mixed at a ratio of 38:57:5 in a tumbling mixer for 20 minutes and then pelletized by melt-kneading in a twin-screw extruder ("TEX 44 SS-30BW-2V" manufactured by Nippon Steel Works, Ltd.) at a temperature of 260° C. to prepare a resin composition.

After being dried at 140° C. for 5 hours, the resin composition was injection molded by means of a 10-oz injection molding machine ("IS 150 E-V" manufactured by Toshiba Machine Co., Ltd.) at a molding temperature of 280° C. and a mold temperature of 80° C. to produce a molded plate.

The plate was set in front of a ultraviolet (UV) irradiating apparatus equipped with a low-pressure mercury lamp made of synthetic quartz (200 W) at a distance of about 15 cm from the light source, and ultraviolet light having its main acting wavelengths at 254 nm and 185 nm was irradiated on the plate in air for 60 seconds.

The irradiated surface of the plate was then spray coated with an acrylic urethane coating ("Origiplate ® Z-NY" produced by Origin Electric Co., Ltd.), followed by baking at 80° C. for 30 minutes.

The initial adhesive strength of the coating was measured, and the result obtained is shown in Table 1 below.

EXAMPLE 2

The procedures of Example 1 were repeated, except that the UV-irradiated molded article was spray coated with an acrylic urethane coating "R 271" produced by Nippon Bee Chemical Co., Ltd., followed by baking at 90° C. for 30 minutes. The initial adhesive strength of the coating is shown in Table 1.

EXAMPLE 3

The procedures of Example 1 were repeated, except that the surface of the molded article was degreased with isopropyl alcohol (hereinafter abbreviated as IPA) prior to the ultraviolet irradiation and that the irradiated plate was spray coated with the same acrylic urethane coating as used in Example 2. The initial adhesive strength of the coating is shown in Table 1.

COMPARATIVE EXAMPLE 1

The procedures of Example 1 were repeated, except that the molded article was not subjected to ultraviolet irradiation. The initial adhesive strength of the coating is shown in Table 1.

COMPARATIVE EXAMPLE 2

The procedures of Example 1 were repeated, except that the molded article was soaked in tetrachloroethylene (hereinafter abbreviated as TCE) at 60° C. for 60 seconds prior to UV irradiation. The initial adhesive strength of the coating is shown in Table 1.

COMPARATIVE EXAMPLE 3

The procedures of Example 2 were repeated, except that the molded article was not subjected to ultraviolet irradiation. The initial adhesive strength of the coating is shown in Table 1.

COMPARATIVE EXAMPLE 4

The procedures of Example 3 were repeated, except that the molded article was not subjected to ultraviolet irradiation. The initial adhesive strength of the coating is shown in Table 1.

COMPARATIVE EXAMPLE 5

The procedures of Example 2 were repeated, except that the molded article was immersed in TCE at 60° C. for 60 seconds prior to UV irradiation. The initial adhesive strength of the coating is shown in Table 1.

EXAMPLE 4

The procedures of Example 1 were repeated, except that the surface of the molded article was degreased with IPA prior to UV irradiation and that the UV-irradiated plate was spray coated with a modified urethane coating ("Flexthane ® #101" produced by Nippon Bee Chemical Co., Ltd.). The initial adhesive strength of the coating is shown in Table 1.

COMPARATIVE EXAMPLE 6

The procedures of Example 4 were repeated, except that the molded article was not subjected to ultraviolet irradiation. The initial adhesive strength of the coating is shown in Table 1.

TABLE 1

| Example No. | Surface Treatment | Coating | Initial Adhesion % |
|---|---|---|---|
| Example 1 | UV irradiation | Origiplate ® Z-NY | 99.9 |
| Example 2 | UV irradiation | R 271 | 73 |
| Example 3 | IPA degreasing + UV irradiation | R 271 | 88 |
| Comparative Example 1 | none | Origiplate ® Z-NY | 20 |
| Comparative Example 2 | immersion in TCE + UV irradiation | Origiplate ® Z-NY | 0 |
| Comparative Example 3 | none | R 271 | 0 |
| Comparative Example 4 | IPA degreasing | R 271 | 26 |
| Comparative Example 5 | immersion in TCE + UV irradiation | R 271 | 0 |
| Example 4 | IPA degreasing + UV irradiation | Flexthane ® #101 | 78 |
| Comparative Example 6 | IPA degreasing | Flexthane ® #101 | 15 |

COMPARATIVE EXAMPLE 7

The procedures of Example 1 were repeated, except that the modified polypropylene was replaced with unmodified polypropylene ("Sumitomo Noblen ® W 501", a propylene homopolymer produced by Sumitomo Chemical Company, Limited). The initial adhesive strength of the coating was found to be 0%.

EXAMPLE 5

The same modified polypropylene, polyamide resin and glycidyl methacrylate-ethylene-vinyl acetate copolymer as used in Example 1 and the above-described modified ethylenepropylene copolymer as a modified rubbery substance were mixed at a ratio of 54:20:2:24, and the mixture was molded in the same manner as in Example 1 to prepare a specimen.

The specimen was irradiated with ultraviolet light in the same manner as in Example 1 and coated with an acrylic urethane coating "Origiplate ® Z-NY", followed by baking. The initial adhesive strength of the coating is shown in Table 2.

COMPARATIVE EXAMPLE 8

The procedures of Example 5 were repeated, except that the molded article was not subjected to ultraviolet irradiation. The initial adhesive strength of the coating is shown in Table 2.

TABLE 2

| Example No. | Surface Treatment | Coating | Initial Adhesion (%) |
|---|---|---|---|
| Example 5 | UV irradiation | Origiplate ® Z-NY | 99 |
| Comparative Example 8 | none | Origiplate ® Z-NY | 0 |

EXAMPLE 6

The same modified polypropylene, polyamide resin and glycidyl methacrylate-ethylene-vinyl acetate copolymer as used in Example 1 and the above-described modified ethylenepropylene copolymer as a modified rubbery substance were mixed at a ratio of 64:10:2:24, and the mixture was molded in the same manner as in Example 1 to prepare a specimen.

The specimen was irradiated with ultraviolet light and then coated with an acrylic urethane coating, followed by baking in the same manner as in Example 1. The initial adhesive strength of the coating is shown in Table 3.

COMPARATIVE EXAMPLE 9

The procedures of Example 6 were repeated, except that the molded article was not subjected to ultraviolet irradiation. The initial adhesive strength of the coating is shown in Table 3.

TABLE 3

| Example no. | Surface Treatment | Coating | Initial Adhesion (%) |
|---|---|---|---|
| Example 6 | UV irradiation | Origiplate ® Z-NY | 94 |
| Comparative Example 9 | none | Origiplate ® Z-NY | 0 |

EXAMPLE 7

The same modified polypropylene, polyamide resin and glycidyl methacrylate-ethylene-vinyl acetate copolymer as used in Example 2 and the above-described modified ethylenepropylene copolymer as a modified rubbery substance were mixed at a ratio of 79:5:2:24, and the mixture was molded in the same manner as in Example 2 to prepare a specimen.

The specimen was irradiated with ultraviolet light, coated with an acrylic urethane coating, and baked in the same manner as in Example 2, except that the irradiation was conducted for 120 seconds. The initial adhesive strength of the coating was found to be 94%.

EXAMPLE 8

Preparation of Co-modified Polyolefin Resin (A)/Rubbery Substance

A hundred parts of a 24.2/12.3 mixture of a commercially available propylene homopolymer ("Sumitomo Noblen ® WF 299B" produced by Sumitomo Chemical Company, Limited) and a commercially available ethylene-propylene copolymer rubber ("E 512P" produced by Sumitomo Chemical Company, Limited) was uniformly mixed with 0.5 part of maleic anhydride, 1.0 part of a propylene homopolymer having carried thereon 8% of 1,3-bis(t-butylperoxyisopropyl)benzene ("Sunperox ® TY 1,3" produced by Sanken Chemical Industrial Co., Ltd.) as a radical initiator, and 0.1 part of a stabilizer ("Irganox ® 1010" produced by Chiba-Geigy AG) in a Henschel mixer. The mixture was melt-kneaded in a twin-screw extruder "TEX 44 SS-30BW-2V" at a temperature of 220° C. for an average retention time of 1.5 min to prepare a co-modified polypropylene-rubber resin composition having a melt flow rate of 14 g/10 min (hereinafter referred to as M-(PP/EPM)-1).

M-(PP/EMP)-1, PA-2 and PA-3, the above-described glycidyl methacrylate-ethylene-vinyl acetate copolymer, and talc were mixed at a ratio of 36.5:44.5:4.5:0.5:14, the talc and PA-2 having been previously melt-kneaded in a twin-screw kneader at 230° C., and the mixture was molded in the same manner as in Example 1.

The resulting specimen was irradiated with ultraviolet light in the same manner as in Example 1.

The UV-irradiated specimen was spray coated with an acrylic urethane coating ("Recrack ® #440H" produced by Fujikura Kasei Co., Ltd.), followed by baking at 80° C. for 30 minutes. The initial adhesive strength of the coating is shown in Table 4.

EXAMPLE 9

The procedures of Example 8 were repeated, except that the surface of the specimen was degreased with IPA prior to ultraviolet irradiation. The initial adhesive strength of the coating is shown in Table 4.

COMPARATIVE EXAMPLE 10

The procedures of Example 8 were repeated, except that the specimen was not subjected to ultraviolet irradiation. The initial adhesive strength of the coating is shown in Table 4.

COMPARATIVE EXAMPLE 11

The procedures of Example 9 were repeated, except that the specimen was not subjected to ultraviolet irradiation. The initial adhesive strength of the coating is shown in Table 4.

TABLE 4

| Example No. | Surface Treatment | Coating | Initial Adhesion (%) |
| --- | --- | --- | --- |
| Example 8 | UV irradiation | Recrack ® #440H | 99.9 |
| Example 9 | IPA degreasing + UV irradiation | Recrack ® #440H | 100 |
| Comparative Example 10 | none | Recrack ® #440H | 0 |
| Comparative Example 11 | IPA degreasing | Recrack ® #440H | 3 |

EXAMPLE 10

A resin composition comprising 30% of a polyphenylene ether resin having a reduced viscosity of 0.46 g/dl as measured in 0.5 g/dl chloroform at 25° C. (produced by Nippon Polyether Co., Ltd.) and 70% of a propylene homopolymer "Sumitomo Noblen ® WF 299B" was preliminarily mixed with 1.6% of maleic anhydride, 2.0% of styrene, 1.0% of 1,3-bis(t-butylperoxyisopropyl)benzene ("Sunperox ® TY 1-3") as a radical initiator, and 1.0% of 1,12-diaminododecane as a compatibilizer in a tumbling mixer. The mixture was pelletized by melt-kneading in a twin-screw kneading machine ("TRM-50" manufactured by Toshiba Machine Co., Ltd.) at 260° C. to prepare a resin composition.

The resin composition was injection molded by means of an injection molding machine ("IS-150E" manufactured by Toshiba Machine Co., Ltd.) to prepare a plate.

The resulting specimen was set in front of a ultraviolet irradiating apparatus equipped with a low-pressure mercury lamp made of synthetic quartz (200 W) at a distance of about 10 cm from the light source, and ultraviolet light having its main acting wavelengths at 254 nm and 185 nm was irradiated on the plate in air for 60 seconds.

The irradiated surface of the plate was then spray coated with an acrylic urethane coating "R 271", followed by baking at 90° C. for 30 minutes.

The initial adhesive strength of the coating is shown in Table 5 below.

EXAMPLE 11

The procedures of Example 10 were repeated, except that the surface of the specimen was degreased with IPA prior to the ultraviolet irradiation. The initial adhesive strength of the coating is shown in Table 5.

COMPARATIVE EXAMPLE 12

The procedures of Example 10 were repeated, except that the specimen was not subjected to ultraviolet irradiation. The initial adhesive strength of the coating is shown in Table 5.

COMPARATIVE EXAMPLE 13

The procedures of Example 11 were repeated, except that the specimen was not subjected to ultraviolet irradiation. The initial adhesive strength of the coating is shown in Table 5.

TABLE 5

| Example No. | Surface Treatment | Coating | Initial Adhesion (%) |
| --- | --- | --- | --- |
| Example 10 | UV irradiation | R 271 | 93 |
| Example 11 | IPA degreasing + UV irradiation | R 271 | 100 |
| Comparative Example 12 | none | R 271 | 0 |
| Comparative Example 13 | IPA degreasing | R 271 | 0 |

EXAMPLE 12

A co-modified polypropylene/rubber resin composition was prepared in the same manner as for M-(PP/EPM)-1 of Example 8, except for changing the propylene homopolymer/ethylenepropylene copolymer rubber ratio to 45/13. The resulting resin composition is hereinafter referred to as M-(PP/EPM)-2.

M-(PP/EPM)-2 and polybutylene terephthalate "Toughpet ® PBT N-1000" as a saturated polyester resin, and the above-described glycidyl methacrylate-ethylene-vinyl acetate copolymer were preliminarily mixed at a ratio of 58:40:2 in a Henschel mixer, and the mixture was melt-kneaded and pelletized in a twin-screw extruder "TEX-44 SS-30BW-2V" at 250° C. to obtain a resin composition.

The resulting resin composition was preliminarily dried at 120° C. for 2 hours and molded by using an injection molding machine "IS-150E" at a molding temperature of 240° C. and a mold temperature of 70° C. to obtain a plate specimen.

The specimen was set in front of a ultraviolet irradiating apparatus equipped with a low-pressure mercury lamp made of synthetic quartz (200 W) at a distance of about 10 cm from the light source, and ultraviolet light having its main acting wavelengths at 254 nm and 185 nm was irradiated on the plate in air for 120 seconds.

The irradiated surface of the plate was then spray coated with an acrylic urethane coating "R 271", followed by baking at 90° C. for 30 minutes.

The initial adhesive strength of the coating is shown in Table 6 below.

COMPARATIVE EXAMPLE 14

The procedures of Example 12 were repeated, except that the specimen was not subjected to ultraviolet irradiation. The initial adhesive strength of the coating is shown in Table 6.

TABLE 6

| Example No. | Surface Treatment | Coating | Initial Adhesion (%) |
|---|---|---|---|
| Example 12 | UV irradiation | R 271 | 95 |
| Comparative Example 14 | none | R 271 | 0 |

As discussed above, the present invention provides a method for surface treating a thermoplastic resin composition molded article to markedly improve surface properties, such as coating properties, adhesion properties, and printability, of the molded article. The present invention also provides a method for coating the molded article.

While the invention has been described in detail and with reference to specific examples thereof, it will be apparent to one skilled in the art that various changes and modifications can be made therein without departing from the spirit and scope thereof.

What is claimed is:

1. A method for surface treating a resin composition molded article, which comprises irradiating a molded article with ultraviolet light having an irradiation wavelength in the region of 300 nm or less, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of at least one thermoplastic resin selected from the group consisting of a polyamide resin, a polyphenylene ether resin, a mixture of a polyphenylene ether resin and a styrene resin, a graft copolymer of a polyphenylene ether resin and styrene, and a saturated polyester resin; and (II) up to 30 parts by weight of at least one compatibilizer for improving compatibility between said polypropylene resin (A) and said thermoplastic resin (B), said compatibilizer being selected from the group consisting of an unsaturated carboxylic acid compound having at least one carboxyl group in the molecule thereof or a derivative thereof, a diamine compound having at least two nitrogen atoms in the molecule thereof or a derivative thereof, and an epoxy-containing copolymer.

2. A method as claimed in claim 1, wherein said resin composition (I) comprises from 10 to 95% by weight of polypropylene resin (A) and from 5 to 90% by weight of thermoplastic resin (B).

3. A method for coating a resin composition molded article, which comprises irradiating a molded article with ultraviolet light having an irradiation wavelength in the region of 300 nm or less and coating the irradiated surface with a coating, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of at least one thermoplastic resin selected from the group consisting of a polyamide resin, a polyphenylene ether resin, a mixture of a polyphenylene ether resin and a styrene resin, a graft copolymer of a polyphenylene ether resin and styrene, and a saturated polyester resin; and (II) up to 30 parts by weight of at least one compatibilizer for improving compatibility between said polypropylene resin (A) and said thermoplastic resin (B), said compatibilizer being selected from the group consisting of an unsaturated carboxylic acid compound having at least one carboxyl group in the molecule thereof or a derivative thereof, a diamine compound having at least two nitrogen atoms in the molecule thereof or a derivative thereof, and an epoxy-containing copolymer.

4. A method as claimed in claim 3, wherein said resin composition (I) comprises from 10 to 95% by weight of polypropylene resin (A) and from 5 to 90% by weight of thermoplastic resin (B).

5. A method for surface treating a resin composition molded article, which comprises irradiating a molded article with ultraviolet light having an irradiation wavelength in the region of 300 nm or less for 20 seconds to 10 minutes, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyamide resin; (II) from 0 to 30 parts by weight of an epoxycontaining copolymer; and (III) from 0 to 50 parts by weight of an inorganic filler and/or glass fiber.

6. A method as claimed in claim 5, wherein said resin composition (I) comprises from 10 to 95% by weight of polypropylene resin (A) and from 5 to 90% by weight of polyamide resin (B).

7. A method as claimed in claim 5, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

8. A method for coating a resin composition molded article, which comprises irradiating a molded article with ultraviolet light having an irradiation wavelength in the region of 300 nm or less for 20 seconds to 10 minutes and coating the irradiated surface with .a coating, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyamide resin; (II) from 0 to 30 parts by weight of an epoxy-containing copolymer; and (III) from 0 to 50 parts by weight of an inorganic filler and/or glass fiber.

9. A method as claimed in claim 8, wherein said coating is a urethane coating.

10. A method as claimed in claim 8, wherein said resin composition (I) comprises from 10 to 95% by weight of polypropylene resin (A) and from 5 to 90% by weight of polyamide resin (B).

11. A method as claimed in claim 9, wherein said resin composition (I) comprises from 10 to 95% by weight of polypropylene resin (A) and from 5 to 90% by weight of polyamide resin (B).

12. A method as claimed in claim 8, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

13. A method as claimed in claim 9, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

14. A method for surface treating a resin composition molded article, which comprises irradiating a molded article with ultraviolet light having an irradiation wavelength in the region of 300 nm or less for 20 seconds to 10 minutes, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyamide resin; (II) from 0.1 to 30 parts by weight of an epoxy-containing copolymer; (III) from 0 to 50 parts by weight of an inorganic filler and/or glass fiber, and from 0.1 to 100 parts by weight of (IV) a rubbery substance and/or (V) a modified rubbery substance.

15. A method as claimed in claim 14, wherein said resin composition (I) comprises from 10 to 95% by weight of polypropylene resin (A) and from 5 to 90% by weight of polyamide resin (B).

16. A method as claimed in claim 14, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

17. A method as claimed in claim 15, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

18. A method for coating a resin composition molded article, which comprises irradiating a molded article with ultraviolet light having an irradiation wavelength in the region of 300 nm or less for 20 seconds to 10 minutes and coating the irradiated surface with a coating, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyamide resin; (II) from 0.1 to 30 parts by weight of an epoxy-containing copolymer; (III) from 0 to 50 parts by weight of an inorganic filler and/or glass fiber; and from 0.1 to 100 parts by weight of (IV) a rubbery substance and/or (V) a modified rubbery substance.

19. A method as claimed in claim 18, wherein said resin composition (I) comprises from 10 to 95% by weight of polypropylene resin (A) and from to 90% by weight of polyamide resin (B).

20. A method as claimed in claim 18, wherein said epoxycontaining copolymer (II) is a copolymer comprising an unsaturated epoxy compound and ethylene or a copolymer comprising an unsaturated epoxy compound, ethylene, and an ethylenically unsaturated compound except for ethylene.

21. A method as claimed in claim 19, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

22. A method as claimed in claim 18, wherein said coating is a urethane coating.

23. A method as claimed in claim 19, wherein said coating is a urethane coating.

24. A method for surface treating a resin composition molded article, which comprises irradiating a molded article with ultraviolet light having an irradiation wavelength in the region of 300 nm or less for 20 seconds to 10 minutes, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyamide resin; and from 0.1 to 100 parts by weight of (IV) a rubbery substance and/or (V) a modified rubbery substance.

25. A method as claimed in claim 24, wherein said resin composition (I) comprises from 10 to 95% by weight of polypropylene resin (A) and from 5 to 90% by weight of polyamide resin (B).

26. A method as claimed in claim 24, wherein said epoxycontaining copolymer (II) is a copolymer comprising an unsaturated epoxy compound and ethylene or a copolymer comprising an unsaturated epoxy compound, ethylene, and an ethylenically unsaturated compound except for ethylene.

27. A method as claimed in claim 25, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

28. A method for coating a resin composition molded article, which comprises irradiating a molded article with ultraviolet light having an irradiation wavelength in the region of 300 nm or less for 20 seconds to 10 minutes and coating the irradiated surface with a coating, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyamide resin; (III) from 0 to 50 parts by weight of an inorganic filler and/or glass fiber; and from 0.1 to 100 parts by weight of (IV) a rubbery substance and/or (V) a modified rubbery substance.

29. A method as claimed in claim 28, wherein said resin composition (I) comprises from 10 to 95% by weight of polypropylene resin (A) and from 5 to 90% by weight of polyamide resin (B).

30. A method as claimed in claim 28, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

31. A method as claimed in claim 29, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

32. A method as claimed in claim 28, wherein said coating is a urethane coating.

33. A method as claimed in claim 29, wherein said coating is a urethane coating.

34. A method for surface treating a resin composition molded article, which comprises irradiating a molded article with ultraviolet light having an irradiation wavelength in the region of 300 nm or less for 20 seconds to 10 minutes, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyphenylene ether resin; (II) from 0.01 to 10 parts by weight of an unsaturated carboxylic acid compound having at least one carboxyl group in the molecule thereof or a derivative thereof and/or from 0.01 to 10 parts by weight of an amine compound having at least two nitrogen atoms in the molecule thereof or a derivative thereof as a compatibilizer; (III) from 0 to 50 parts by weight of an inorganic filler and/or glass fiber; and from 0 to 100 parts by weight of (IV) a rubbery substance and/or (V) a modified rubbery substance.

35. A method as claimed in claim 34, wherein said resin composition (I) comprises from 10 to 95% by weight of polypropylene resin (A) and from 5 to 90% by weight of polyphenylene ether resin (B).

36. A method as claimed in claim 34, wherein said unsaturated carboxylic acid compound or a derivative thereof is maleic anhydride.

37. A method as claimed in claim 35, wherein said unsaturated carboxylic acid compound or a derivative thereof is maleic anhydride.

38. A method as claimed in claim 34, wherein said amine compound or a derivative thereof is 1,12-diaminododecane.

39. A method as claimed in claim 35, wherein said amine compound or a derivative thereof is 1,12-diaminododecane.

40. A method as claimed in claim 34, wherein said polyphenylene ether resin (B) is poly(2,6-dimethyl-1,4-phenylene)ether.

41. A method as claimed in claim 35, wherein said polyphenylene ether resin (B) is poly(2,6-dimethyl-1,4-phenylene)ether.

42. A method for coating a resin composition molded article, which comprises irradiating a molded article with ultraviolet light having an irradiation wavelength in the region of 300 nm or less for 20 seconds to 10 minutes and coating the irradiated surface with a coating, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a polyphenylene ether resin; (II) from 0.01 to 10 parts by weight of an unsaturated carboxylic acid compound having at least one carboxyl group in the molecule thereof or a derivative thereof and/or from 0.01 to 10 parts by weight of an amine compound having at least two nitrogen atoms in the molecule thereof or a derivative thereof as a compatibilizer; (III) from 0 to 50 parts by weight of an inorganic filler and/or glass fiber; and from 0 to 100 parts by weight of (IV) a rubbery substance and/or (V) a modified rubbery substance.

43. A method as claimed in claim 42, wherein said resin composition (I) comprises from 10 to 95% by weight of polypropylene resin (A) and from 5 to 90% by weight of polyphenylene ether resin (B).

44. A method as claimed in claim 42, wherein said unsaturated carboxylic acid compound or a derivative thereof is maleic anhydride.

45. A method as claimed in claim 43 wherein said unsaturated carboxylic acid compound or a derivative thereof is maleic anhydride.

46. A method as claimed in claim 42, wherein said amine compound or a derivative thereof is 1,12-diaminododecane.

47. A method as claimed in claim 43, wherein said amine compound or a derivative thereof is 1,12-diaminododecane.

48. A method as claimed in claim 42, wherein said polyphenylene ether resin (B) is poly(2,6-dimethyl-1,4-phenylene)ether.

49. A method as claimed in claim 43, wherein said polyphenylene ether resin (B) is poly(2,6-dimethyl-1,4-phenylene)ether.

50. A method as claimed in claim 42, wherein said coating is a urethane coating.

51. A method as claimed in claim 43, wherein said coating is a urethane coating.

52. A method as claimed in claim 44, wherein said coating is a urethane coating.

53. A method as claimed in claim 45, wherein said coating is a urethane coating.

54. A method as claimed in claim 46, wherein said coating is a urethane coating.

55. A method as claimed in claim 47, wherein said coating is a urethane coating.

56. A method as claimed in claim 48, wherein said coating is a urethane coating.

57. A method as claimed in claim 49, wherein said coating is a urethane coating.

58. A method for surface treating a resin composition molded article, which comprises irradiating a molded article with ultraviolet light having an irradiation wavelength in the region of 300 nm or less for 20 seconds to 10 minutes, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a saturated polyester resin; (II) from 0.1 to 30 parts by weight of an epoxy-containing copolymer as a compatibilizer; (III) from 0 to 50 parts by weight of an inorganic filler and/or glass fiber; and from 0 to 100 parts by weight of (IV) a rubbery substance and/or (V) a modified rubbery substance.

59. A method as claimed in claim 58, wherein said resin composition (I) comprises from 10 to 95% by weight of polypropylene resin (A) and from 5 to 90% by weight of saturated polyester resin (B).

60. A method as claimed in claim 58, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

61. A method as claimed in claim 59 wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

62. A method for coating a resin composition molded article, which comprises irradiating a molded article with ultraviolet light having an irradiation wavelength in the region of 300 nm or less for 20 seconds to 10 minutes and coating the irradiated surface with a coating, said molded article being obtained from a resin composition comprising (I) 100 parts by weight of a resin composition comprising (A) from 5 to 99.5% by weight of a polypropylene resin selected from the group consisting of polypropylene, modified polypropylene, and a modified polypropylene/polypropylene composition and (B) from 0.5 to 95% by weight of a saturated polyester resin; (II) from 0.1 to 30 parts by weight of an epoxy-containing copolymer as a compatibilizer; (III) from 0 to 50 parts by weight of an inorganic filler and/or glass fiber; and from 0 to 100 parts by weight of (IV) a rubbery substance and/or (V) a modified rubbery substance.

63. A method as claimed in claim 62, wherein said resin composition (I) comprises from 10 to 95% by weight of polypropylene resin (A) and from 5 to 90% by weight of saturated polyester resin (B).

64. A method as claimed in claim 62, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

65. A method as claimed in claim 63, wherein said epoxy-containing copolymer (II) is a copolymer comprising an unsaturated epoxy compound and ethylene or a copolymer comprising an unsaturated epoxy compound, ethylene, and an ethylenically unsaturated compound except for ethylene.

* * * * *